Dec. 14, 1943.                M. J. SMITH                2,336,968
                                VALVE
                          Filed Feb. 4, 1942

INVENTOR.
MERTON J. SMITH
BY Robert W. Wilson
ATTORNEY

Patented Dec. 14, 1943

2,336,968

UNITED STATES PATENT OFFICE 2,336,968

VALVE

Merton J. Smith, Cleveland, Ohio, assignor of twenty-five per cent to Paul B. Shannon, Chicago, Ill., twenty-five per cent to John Perry Geiger, Cleveland, Ohio, and twenty-five per cent to Robert W. Wilson, Rocky River, Ohio Application February 4, 1942, Serial No. 429,559

6 Claims. (Cl. 137—153)

This invention has for its aim the provision of a pressure regulating escape valve particularly adapted for use in the fuel supply system of an internal combustion engine of the injection-fed type, and is particularly adapted for use in connection with the injection system for Diesel or semi-Diesel engines which is shown in my Patent No. 2,183,875 and in my co-pending application, Serial No. 309,623. It is not limited thereto. Other possible uses may include such purposes as hydraulic control systems of all sorts, heating systems, and other applications.

It is known in the art to supply an excess of liquid fuel under pressure to an internal combustion engine and recirculate the quantity not needed. Valves for the purpose as used in the prior art have large heavy spiral springs to resist the fuel pressure. Such valves have to be taken apart and have new springs substituted in order to be made effective for pressure ranges other than those for which any particular spring is designed.

Specifically then, the present invention aims to provide a valve which is particularly adapted for the service indicated, which is controllable by very slight force, and thus, when used with an engine, can receive such control from either an automatic or a manual throttle. Furthermore, the valve of my invention avoids the disadvantages of the prior art in that without opening the casing or changing any parts it can be set for operation in selected ones of a variety of ranges of response; it requires very slight force to respond to running conditions within whatever range it is set for, is compact, simple, sturdy, easy and cheap to manufacture, and easily taken down or reassembled when necessary.

It will be understood that the recital of certain purposes and advantages of my invention does not exclude others not named, and it will also be understood that embodiments of my invention disclosed in the present specification and drawing do not limit the invention thereto, but teach a preferred form which is capable of modification within the principles thereof.

Figure 1:
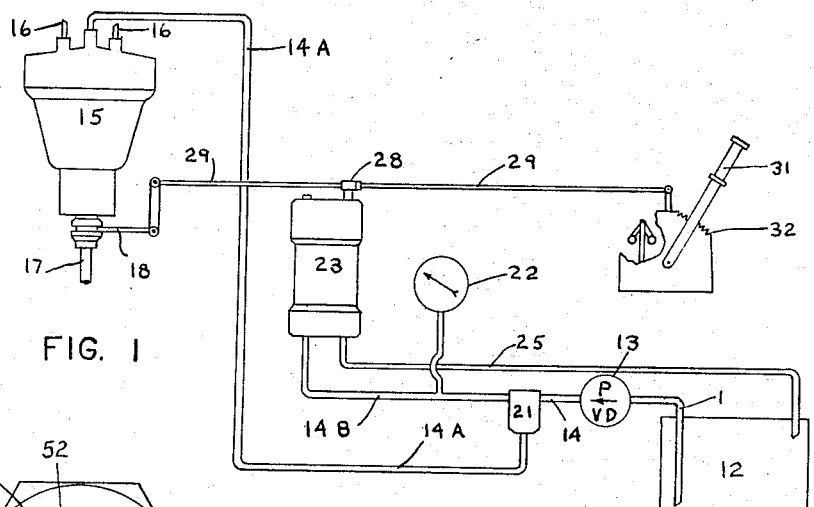
Fig. 1 is a diagrammatic showing of a typical installation wherein my invention is employed.

The engine, which may be of any type using liquid fuel, is omitted from Fig. 1 to simplify the drawing. In Fig. 1 a distributing injection system is indicated, simply by way of definite illustration, which may be that disclosed by my Patent No. 2,183,875, Liquid feed apparatus, issued December 19, 1939, although the present valve might be used in other surroundings, or for other purposes, one of which might be hydraulic control systems for machine tools or others, some of which are mentioned above. The oil or other fuel is supplied from a tank 12 by means of a pump 13 through a supply line 14 which branches at 14A to a distributor 15, and thence by feed tubes 16 to the respective cylinders of an engine, not shown. The distributor includes a rotor shaft 17 driven in synchronism with the engine. A bell crank lever 18 moves control elements which affect the fuel supply to the cylinders, either as to time or quantity or both. Accessories such as a combined air trap and check valve 21 and a pressure gauge 22 may be appropriately connected to the supply line.

The pressure regulating escape valve 23 is connected to a branch 14B of the supply line between the pump 13 and the distributor 15, and has an outlet 25 with return connection to the tank 12. An actuating arm 28 for the valve is operatively connected to a rod 29 which runs from the control station to the lever 18. The control station is here diagrammatically illustrated by way of example as a hand throttle 31 which can be latched in its setting on a rack 32, and a flyball governor 33. It will be understood that the showing is indicative of any manual or automatic control. For instance the speed-responsive governor or other control mechanism may be either combined with or substituted for the throttle 31. Through the rod 29 the controlling movement is carried to both the valve 23 and the distributor 15. The particular details of the control station mechanism are no part of the present invention; many mechanisms of the sort are known and any suitable one may be used.

Coming to the details of the valve 23, the body 23A is preferably cylindrical, with three principal longitudinal internal bores and certain secondary passages and other features therein, with a stout cap 23B on one end and the liquid connections 14B and 25 on the other. As indicated in Fig. 1, the valve is usually installed in the assembly with the cap end at the top. The longitudinal bores constitute respectively an intake 35 with a dead-ended excess length 35A for surge cushioning, a larger central bore 36 with a piston 37 therein, and an outlet passage 38. The intake 35 is connected by a duct 39 near its bottom to a space 41 in the lower part of the central bore 36. The space 41 is connected by a lift valve 42, preferably of the conical type and a duct 43 to the outlet passage 38, while the upper end of the outlet passage communicates with a countersink 44 at the top of the central bore 36, to carry off leakage past the piston. The piston 37 fits in all but the lower part of the central bore 36 and projects upwardly above the bore and above the top 45 of the valve body 23A, with its upper end slightly rounded as shown in exaggeration at 37A. Turning on its axis makes no difference in its action, since the rounding is symmetrical to the axis. The lower end of the piston is reduced to a stem 37B and shouldered at 37C above the duct 39, thus leaving the space 41. The stem 37B is conical pointed and constitutes a needle or cone valve closure.

A spring lever, preferably in disk shape and being metal disk 47, is disposed on the top 37A of the stem 37, centrally located inside the cap 23B, spaced from the inside of the cap and from the top 45 of the valve body. Screws 48 and 49, threaded through the cap, bear on the disk at opposite circumferential positions. The short screw 49 is intended to be moved only for permanent adjustments, while the longer screw 48 is movable in operation of the engine by the rod 29 through arm 28 clamped thereon, to relate the valve action to the controls. The screw 48 can also be changed in permanent adjustment when the clamp is loosened. The disk 47 has a certain amount of resiliency, so that it acts as a stiff spring which resists the lifting tendency due to the fuel pressure on the shoulder 37C, besides having a lever action. This pressure may be on the order of thousands of pounds per square inch in Diesel practice.

Figure 3:
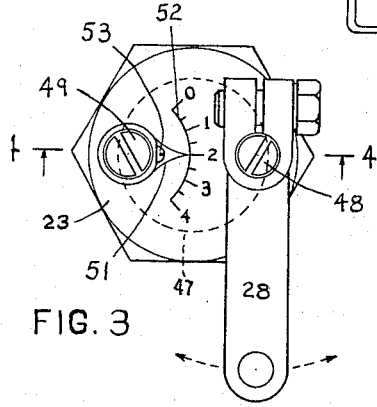
Fig. 3 is a top plan view of the valve of Fig. 2, but with an indicator added.
Figure 2:
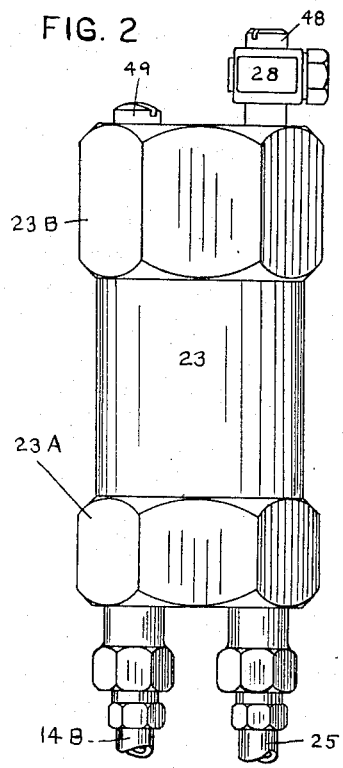
Fig. 2 is an elevation of my valve.
Figures 4, 5:
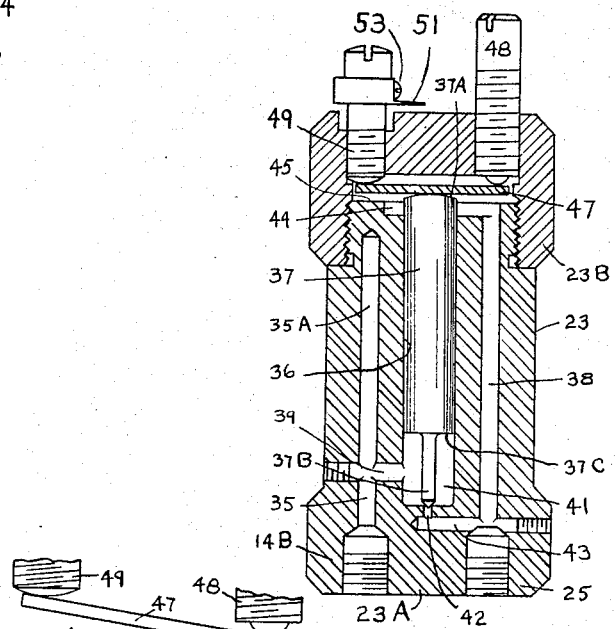
Fig. 4 is a central longitudinal section on plane 4—4 of Fig. 3, in the direction of the arrows, with some parts in elevation.
Figs. 5, 6 and 7 are enlarged details from the upper part of Fig. 4, showing settings for different pressure ranges, the showings being exaggerated for clearness of illustration.
Figure 6:
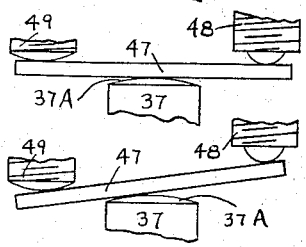
Figure 7:
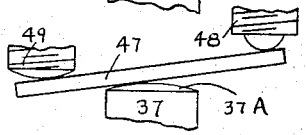

The action of the disk and the two screws is explained with the aid of Figs. 5, 6 and 7. In Figs. 5, 6 and 7 the movement of parts is greatly exaggerated and the curvature of piston head 37A is likewise exaggerated. The settings of the bearing screws 48 and 49 and the tilt of the disk 47 are in the nature of permanent adjustments according to the pressure range of fuel supply best adapted for the particular engine to which the valve is attached, the character of the fuel being used, and so on. Referring to Fig. 6, the two bearing screws are shown at the same level and the disk horizontal. Considering the disk as a lever, the vertical movement of the screw 48 will be halved at its point of contact with the center of the piston head 37A. The total vertical movement of bearing screw 48 for a 45° movement of the lever 28 is only about .005" or .006" and the effect of the vertical movement is to vary the loading on the disk 47. Assuming for purposes of illustration, that the valve at 42 will lift at 3000 lbs. pressure when the bearing screw 48 is in its downmost position (lever 28 at left limit of its travel, Fig. 3), then movement of lever 28 to mid position (full line) will allow the valve to open at about 1875 lbs. and movement to full right, raising 48 to uppermost position, will allow the valve to open at about 750 lbs. Although there is some rolling of the point of contact of the disk on the piston head, it is insignificant, and so is not shown in the drawing. The lift of the needle point off seat at 42 is about .0002".

Now assume that the character of fuel or some other factor alters so that higher pressures are needed. The bearing screw 49 is raised, as in Fig. 5, the clamp on lever 28 is loosened and the bearing screw 48 is turned down and the clamp again tightened, thereby producing the condition shown exaggerated in Fig. 5, where the disk 47 bears near the right edge of the piston head 37A. Now movement of screw 48 for unit distance causes movement at the bearing point of about ⅔ unit distance (instead of only ½ as in Fig. 6) so that the load change on spring disk 47 is greater for the range of movement of screw 48 than was the case in Fig. 6. Consequently, the effect of moving lever 28 to full left position may be assumed as making 4000 lbs. pressure necessary to lift the valve at 42; mid (full line) position allows it to lift at about 2350 lbs.; and full right position still allows it to lift at about 750 lbs.

Going in the other direction, Fig. 7 shows settings for lower pressures. Screw 48 has been raised and screw 49 lowered, thus moving the bearing point on the piston head leftward so that unit vertical movement at 48 results in approximately ⅓ of unit movement at the bearing point. Then, compared to Figs. 5 and 6, the maximum pressure will be 2000 lbs., the mid pressure 1375 lbs. and the lowest still 750 lbs., all values being approximate. In all positions, Figs. 5, 6 and 7, the change in point of contact of the disk on the piston head due to movement of the long screw by lever 28 is negligible, so not shown in the drawing. The values given in the above examples are merely illustrative.

To change the range of such variations as are described above, both screws can be changed in the same direction; tightening both brings the range into higher pressures; loosening both brings the range into lower pressures.

Adjustments described above are intended to be made at the factory or at a service station where the engine and pressure regulating valve are overhauled.

If desired an indicator may be employed so that minor adjustments can be made by the operator. This indicator is optional, so is not shown on all figures. After the engine and valve are adjusted at the factory or after overhaul the pointer 51 is set at the middle of the scale 52 and clamped by set screw 53. Such setting indicates an adjustment of screw 49 suitable for, say, medium fuel, as may be indicated by numeral "2" on the scale. Should the operator of the engine be obliged to use a lighter grade of fuel than is indicated by medium setting, he can himself move the screw 49 until the pointer indicates some value less than indicated by "2," related to the weight or other characteristics of the fuel. Similarly should the fuel be heavier the screw 49 can be moved until the indicator 51 points to a suitable higher value on the scale 52.

Having described a preferred form of my invention it will be understood that I do not limit myself to the particular embodiment and exact details shown and described, but that it may be varied within its principles, all within the scope of the appended claims.

I claim:

1. A valve for a liquid supply system comprising in combination a resilient disk, two screws bearing on the same face of said disk at diametrally opposed points adjacent the periphery of said disk, a piston upon the upper end of which the central portion of said disk is urged by said screws, a source of liquid supply, said liquid being adapted to move said piston in opposition to the pressure of said two screws, and an orifice-closing member adapted to be moved in an opening direction by said movement of said piston.

2. A valve for a liquid supply system comprising in combination a flat spring, two screws bearing on the same face of said disk at diametrally opposed points adjacent the periphery of said disk, one of said screws being movable responsive to impulses other than that of the liquid in the system, a piston upon the upper end of which the central portion of said disk is urged by said screws, a source of liquid supply, said liquid supply being adapted to move said piston in opposition to the pressure of said two screws, and an orifice-closing member adapted to be moved in an opening direction by said movement of said piston.

3. A valve for an engine fuel supply system comprising in combination a resilient disk, two screws bearing on the same face of said disk at diametrally opposed points adjacent the periphery of said disk, one of said screws being movable in conjunction with the engine control system, a piston upon the upper end of which the central portion of said disk is urged by said screws, a source of fluid fuel supply, the fluid of said supply being adapted to move said piston in opposition to the pressure of said two screws, and an orifice-closing member adapted to be moved in an opening direction by said movement of said piston.

4. A pressure responsive valve comprising a piston adapted to be moved by the liquid under the control of said valve, an orifice opened and closed by movement of said piston, a flat spring resisting the pressure-occasioned movement of said piston and bearing against an end thereof at a moving point of application, adjustable bearing elements bearing upon said spring at points on opposite sides of the point where said spring bears upon the piston, one of said elements being adapted for adjustment to establish a range of pressures wherein the valve is to work, the other of said elements being adapted for movement responsive to fluctuating conditions to vary spring pressure, and means for changing the bearing force of said last-named element according to such fluctuating conditions.

5. In a valve, in combination, a casing, a stem longitudinally movable therein, said stem being reduced adjacent one end thereby forming a shoulder constituting a piston, which shoulder with interior walls of said casing forms a chamber, an inlet and outlet connections to said chamber for fluid whose flow is controlled by said valve, the reduced portion of said stem being adapted to close said outlet; the top of said stem being rounded and projecting into a closed space which is connected to the outlet from said chamber, a flat spring in said casing bearing on said rounded top, screws bearing down on opposite sides of the same face of said spring, one of said screws being adjustable to determine a range of operating pressures and to vary the point of application of spring pressure upon said rounded top, the other of said screws being adjustable to change pressure of said spring according to requirements for fluid.

6. In a pressure regulating escape valve, a disk shaped spring, two adjustable bearings bearing on the same face of said spring at diametrically opposite points adjacent the periphery of said spring, a piston having said disk pressed upon its upper surface by said bearings, said upper surface of said piston being slightly convex, so that tilting of said spring by changing the adjustment of said bearings shifts the bearing point of said spring upon said upper surface of said piston, and means for controlling adjustment of one of said bearings by conditions other than pressure.

MERTON J. SMITH.